(12) United States Patent
Liu

(10) Patent No.: US 10,779,375 B2
(45) Date of Patent: Sep. 15, 2020

(54) LED DRIVING CIRCUIT AND PROTECTION CIRCUIT FOR DC/DC CONVERTER

(71) Applicant: CURRENT LIGHTING SOLUTIONS, LLC, East Cleveland, OH (US)

(72) Inventor: Zhichao Liu, ShangHai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 41 days.

(21) Appl. No.: 15/527,206

(22) PCT Filed: Nov. 17, 2015

(86) PCT No.: PCT/CN2015/094784
§ 371 (c)(1),
(2) Date: Aug. 29, 2017

(87) PCT Pub. No.: WO2016/078567
PCT Pub. Date: May 26, 2016

(65) Prior Publication Data
US 2017/0367162 A1    Dec. 21, 2017

(30) Foreign Application Priority Data
Nov. 17, 2014 (CN) .......................... 2014 1 0654736

(51) Int. Cl.
*H05B 47/10* (2020.01)
*H05B 45/37* (2020.01)
(Continued)

(52) U.S. Cl.
CPC ............ *H05B 47/10* (2020.01); *G05F 1/618* (2013.01); *H02H 7/12* (2013.01); *H02M 1/32* (2013.01);
(Continued)

(58) Field of Classification Search
None
See application file for complete search history.

(56) References Cited

U.S. PATENT DOCUMENTS

| 7,254,000 B1 | 8/2007 | Smith et al. |
| 2010/0072968 A1* | 3/2010 | Bianco ................... H02M 3/156 323/284 |
| 2014/0197739 A1* | 7/2014 | Lu ...................... H05B 33/0815 315/122 |

FOREIGN PATENT DOCUMENTS

| CN | 201860487 U | 6/2011 |
| CN | 102222904 A | 10/2011 |

(Continued)

OTHER PUBLICATIONS

International Search Report and Written Opinion issued in connection with corresponding PCT Application No. PCT/CN2015/094784 dated Jan. 29, 2016.

(Continued)

*Primary Examiner* — Jany Richardson
(74) *Attorney, Agent, or Firm* — Buckley, Maschoff & Talwalkar LLC

(57) ABSTRACT

A protection circuit for an LED driver and a DC/DC converter. The LED driver includes a DC/DC converter and a protection circuit. The DC/DC converter is used to convert the input voltage of the DC voltage input terminal into an output voltage, which comprises a high frequency switch and an inductor. The protection circuit comprises a detection module, a trigger module and a locking module. The detection module is coupled to the inductor for detecting the output voltage and outputting the voltage detection signal. The trigger module is used to receive the voltage detection signal and output a voltage trigger signal when the voltage detection signal is a negative voltage and the absolute value of the negative voltage is greater than or equal to the preset (Continued)

value. The locking module is coupled to the trigger module and stops the high frequency switch from operating after receiving the voltage trigger signal.

16 Claims, 5 Drawing Sheets

(51) Int. Cl.
  *H05B 45/46* (2020.01)
  *H05B 45/50* (2020.01)
  *H02M 3/156* (2006.01)
  *H02M 1/00* (2006.01)
  *H02H 7/12* (2006.01)
  *H02M 1/32* (2007.01)
  *G05F 1/618* (2006.01)

(52) U.S. Cl.
  CPC .............. *H05B 45/37* (2020.01); *H05B 45/46* (2020.01); *H05B 45/50* (2020.01); *H02M 3/156* (2013.01); *H02M 2001/0009* (2013.01); *Y02B 20/341* (2013.01)

(56) References Cited

FOREIGN PATENT DOCUMENTS

| | | |
|---|---|---|
| CN | 202385330 U | 8/2012 |
| CN | 203326685 U | 12/2013 |
| KR | 101228775 B1 | 1/2013 |

OTHER PUBLICATIONS

Unofficial English Translation of Chinese Office Action issued in connection with corresponding CN Application No. 201410654736.0 dated Aug. 21, 2017.

* cited by examiner

LED DRIVING CIRCUIT AND PROTECTION CIRCUIT FOR DC/DC CONVERTER

TECHNICAL FIELD

The present invention relates to the field of LED lighting, and more particularly to a LED Circuit having a protection circuit.

BACKGROUND OF THE INVENTION

With the declining costs of LED manufacturing, LED lights with high efficiency, low power consumption, long life and other advantages will become more widely used in the field of lighting. In practical applications, the stability of the circuit design has attracted more and more attention, therefore overvoltage protection for the LED driver is particularly important.

The traditional overvoltage protection circuit is often more complex, while there is a continuous current flow when the LED is operating, leading to the entire circuit generating additional power loss. On the other hand, in order to meet the needs of different brightness and energy saving goals, LED and traditional dimming circuits needed to be combined together. At this point, the traditional overvoltage protection circuit will participate in the operating resonance of the driver, thereby impacting the universality of dimming circuit selection.

BRIEF DESCRIPTION OF THE INVENTION

For the above reasons, it is necessary to provide a protection circuit for a DC/DC conversion circuit and an LED driver including this protection circuit to solve the technical problem mentioned above.

In one embodiment of the present invention, an LED driver comprises a DC/DC conversion circuit and a protection circuit. The DC/DC conversion circuit is used to convert the input voltage of the DC voltage input terminal into the output voltage, and the DC/DC conversion circuit comprises a high frequency switch and the first inductor. The protection circuit comprises a detection module, a trigger module and a locking module. The detection module is coupled to the first inductor for detecting the output voltage and outputting a voltage detection signal; the trigger module is used for receiving the voltage detection signal, and to output a voltage trigger signal when the voltage detection signal is negative and the absolute value of the negative voltage is greater than or equal to the present value; the locking module is coupled to the trigger module and stops the high frequency switch from operating after receiving the voltage trigger signal.

In one embodiment of the present invention, a protection circuit of a DC/DC converter comprises a protection circuit that comprises a detection module, trigger module and locking module. The protection circuit comprises a detection module, a trigger module and a locking module. The detection module is coupled to the first inductor for detecting the output voltage and outputting a voltage detection signal; the trigger module is used for receiving the voltage detection signal, and to output a voltage trigger signal when the voltage detection signal is negative and the absolute value of the negative voltage is greater than or equal to the present value; the locking module is coupled to the trigger module and stops the high frequency switch from operating after receiving the voltage trigger signal.

The protection circuit of the DC/DC converter may be used in a self-oscillating circuit. When the DC/DC converter is in normal operation, there is no current flow in the locking circuit of the protection circuit, so no additional power loss is generated from the entire circuit. Also, when the DC/DC converter and the dimming circuit are combined, the protection circuit does not participate in the operating resonance of the driver, thereby improving the universality of the dimming circuit.

BRIEF DESCRIPTION OF THE DRAWINGS

The present invention will be better understood from the following description of embodiments of the present invention taken in conjunction with the accompanying drawings, in which.

DETAILED DESCRIPTION OF THE INVENTION

Unless otherwise defined, the technical and scientific terms used in the claims and the specification are as they are usually understood by those skilled in the art to which the present invention pertains. "First", "second" and similar words used in this specification and in the claims do not denote any order, quantity or importance, but are merely intended to distinguish between different constituents. Similarly, the terms "one", "a" and the like are not meant to be limiting, but rather denote the presence of at least one. "Comprising", "consisting" and similar words mean that elements or articles appearing before "comprising" or "consisting" include the elements or articles and their equivalent elements appearing behind "comprising" or "consisting", not excluding any other elements or articles. "Connected", "coupled" and similar words are not restricted to physical or mechanical connections, but may include electrical connections, whether direct or indirect.

Figure 1:
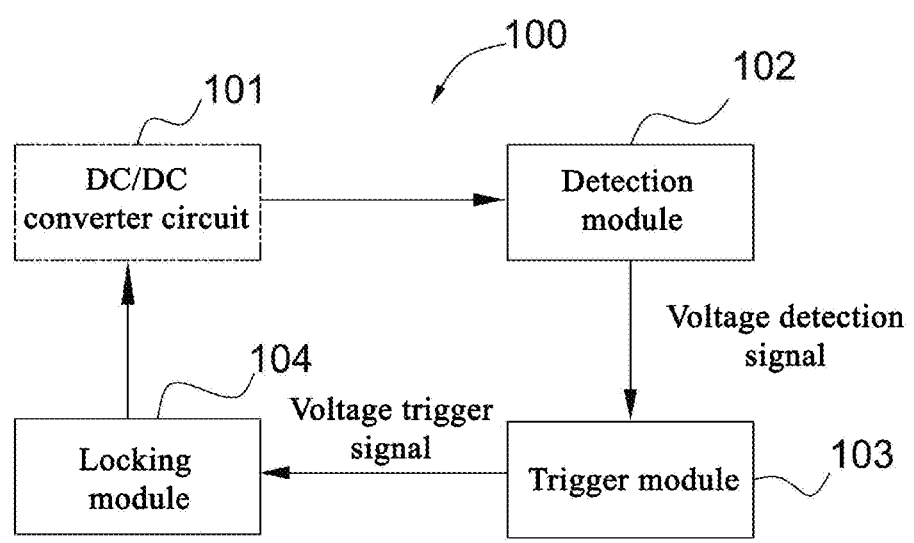
FIG. 1 shows a schematic diagram of an embodiment of a DC/DC converter protection circuit in the LED driver of the present invention.

FIG. 1 shows a schematic diagram of a module of an embodiment of a DC/DC converter protection circuit in the LED driver of the present invention. This protection circuit 100 is used for overvoltage protection of the DC/DC converter 101 in the LED driver. The DC/DC converter 101 may be a step-up DC/DC converter, a step-down DC/DC converter and a step-up/step-down DC/DC converter. The protection circuit 100 comprises a detection module 102, a trigger module 103 and a locking module 104. The DC/DC converter 101 is used for converting the input voltage at the DC voltage input terminal into an output voltage. The detection module 102 is coupled to the DC/DC converter 101 for detecting the output voltage and outputting a voltage detection signal. The trigger module 103 is used for receiving a voltage detection signal and outputting a voltage trigger signal when the voltage detection signal is a negative voltage and the absolute value of the negative voltage is greater than or equal to the preset value. The locking module 104 is coupled to the trigger module and locks the DC/DC converter after receiving the voltage trigger signal.

Figure 2:
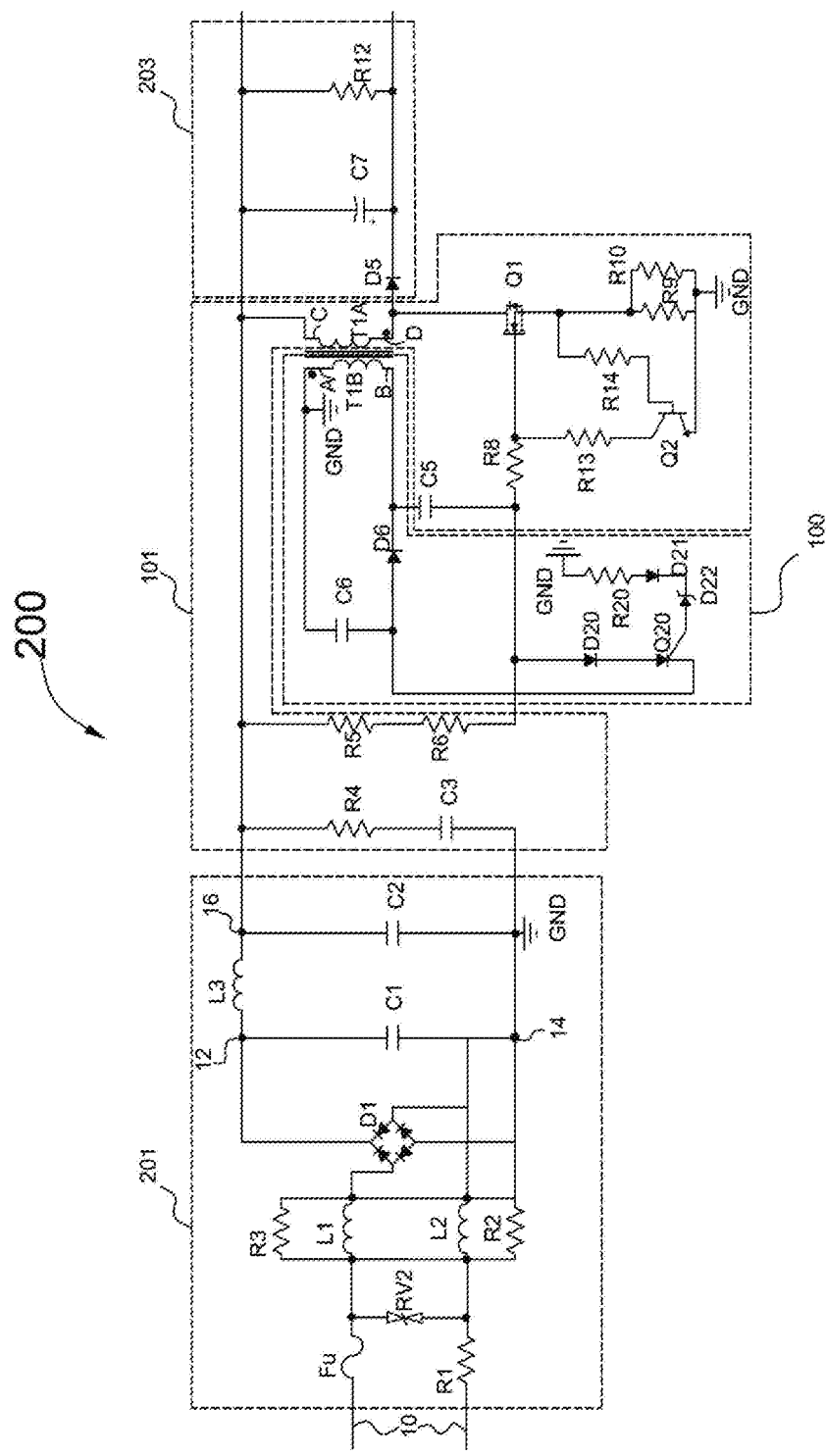
FIG. 2 shows a circuit schematic diagram of an embodiment of the LED driver of the present invention.

FIG. 2 shows a schematic circuit diagram of an embodiment of the LED driver of the present invention. The LED driver 200 comprises a power supply output terminal 10, an EMI rectifier filter 201, a DC/DC converter 101, a protection circuit 100 and a load circuit 203. The EMI rectifier filter 201 is used for converting the AC power input from the power supply input terminal 10 into direct current, and then converting the DC input voltage into a DC output voltage through the DC/DC converter 101, and supplying the AC power to the load circuit 203.

In the embodiment shown in FIG. 2, the EMI rectifier filter 201 comprises a rectifier D1, a fuse Fu and a selectively connected resistor R1. The rectifier D1 may be a bridge rectifier. The resistor R1 is connected between the power supply output terminal 10 and the rectifier filter 201 for current limiting. The EMI rectifier filter 201 further comprises an inductor L1 and an inductor L2 connected between the power supply output terminal 10 and the rectifier D1, a resistor R3 connected in parallel with inductor L1, a resistor R2 connected in parallel with inductor L2, and a varistor RV2 used for lightning protection. In other embodiments, the EMI rectifier filter 201 may comprise other circuit connections known to those skilled in the art.

The rectifier filter 201 further comprises an inductor L3 for filtering, a capacitor C1, and a capacitor C2. The output terminal 12 and the contact 14 of the rectifier D1 are respectively connected to both ends of the capacitor C1. One end of the inductor L3 is coupled to the output terminal 12, the other end is coupled to the contact 16 at one end of the capacitor C2, while the other end of the capacitor C2 is grounded. The contact 16 at one end of the capacitor C2 is the DC signal output terminal of the rectifier filter 201.

In the embodiment shown in FIG. 2, the DC/DC converter 101 comprises a high frequency switch Q1 and a first inductor T1A. The high frequency of the high frequency switch Q1 is relative to the linear frequency, which should be higher than 10 kHz under normal conditions. The high frequency switch Q1 can be MOSFT, IGBT, solid state switch and other fixed, semi-controllable or controllable switching devices. The DC/DC converter 101 receives the DC voltage output from the rectifier filter 201 to be supplied to the first inductor T1A, and transmitted to the DC output voltage of the load circuit 203 through the on-off control of the high frequency switch Q1. The first inductor T1A has two contacts at both ends, contact C and contact D, where contact C is coupled to contact 16, and contact D is coupled to the gate of the high frequency switch Q1.

The DC/DC converter 101 further comprises starting resistors R5 and R6, a driving resistor R8, and a second capacitor C5. One end of the starting resistor R5 is coupled to the contact point 16, the other end of the starting resistor R5 is connected in series with the starting resistor R6, while the other end of the driving resistor R8 is coupled to the gate of the high frequency switch Q1. The starting resistors R5 and R6 are used to start the high frequency switch Q1, and after the high frequency switch Q1 has started, the starting resistors R5 and R6 do not operate. The driving resistor R8 and the second capacitor C5 constitute an RC oscillator to control the resonance of the high frequency switch Q1, so as to control the DC voltage of the output of the DC/DC converter.

The DC/DC converter 101 further comprises a damping circuit coupled to the DC voltage input terminal. The damping circuit comprises a damping resistor R4 and a third capacitor C3. One end of the damping resistor R4 is coupled to the contact 16, while the other end is connected to the third capacitor C3 in series then grounded. The damping resistor R4 and the third capacitor C3 are used for tangential dimming as well as improving the compatibility between the dimming circuit (not shown) and the driver 200.

The DC/DC converter 101 further comprises sampling resistors R9 and R10, a resistor R13, and a switch Q2. One end of the resistor R13 is coupled to the point of intersection between the driving resistor R8 and the high frequency switch Q1, while the other end is connected to the collector of the switch Q2. The base of the switch Q2 is connected to one end of the resistor R14, while the other end of the resistor R14 is connected to the source of the high frequency switch Q1. The resistor R9 is connected in parallel with the resistor R10, with one end connected to the source of the high frequency switch Q1 and collecting the operating voltage of the high frequency switch Q1, while the other end is grounded together with the emitter of the switch Q2. In other embodiments, the sampling resistors R9 and R10 may be replaced by a resistor or replaced with a plurality of resistors connected in parallel or connected through other methods. The resistors R13 and R14, as well as the switch Q2, constitute the peak current limiting circuit of the high frequency switch Q1. When the operating voltage of the high frequency switch Q1 is greater than the preset value of the switch Q2, the switch Q2 is turned off and the high frequency switch Q1 is short-circuited. In the present embodiment, the switch Q2 may be a comparator, with the voltage preset value of the comparator being 0.7 V. In other embodiments, the peak current limiting circuit may use other circuit connections known to those skilled in the art.

In the embodiment shown in FIG. 2, the load circuit 203 comprises a diode D5, a capacitor C7, and a resistor R12. The cathode of the diode D5 is coupled to the contact D of the inductor T1A and receives the DC output voltage from the inductor T1A. The anode of the diode D5 outputs a high frequency alternating voltage. The positive pole of the capacitor C7 is coupled with the anode of the diode D5, the negative terminal of the capacitor C7 is connected with the contact C of the inductor T1A, while the capacitor C7 acts as a regulator. The resistor R12 and the capacitor C7 are connected in parallel then coupled with the load, which protects the load. In the present embodiment, at least one LED is combined with other circuit elements as a load to form an optical device.

Figure 3:
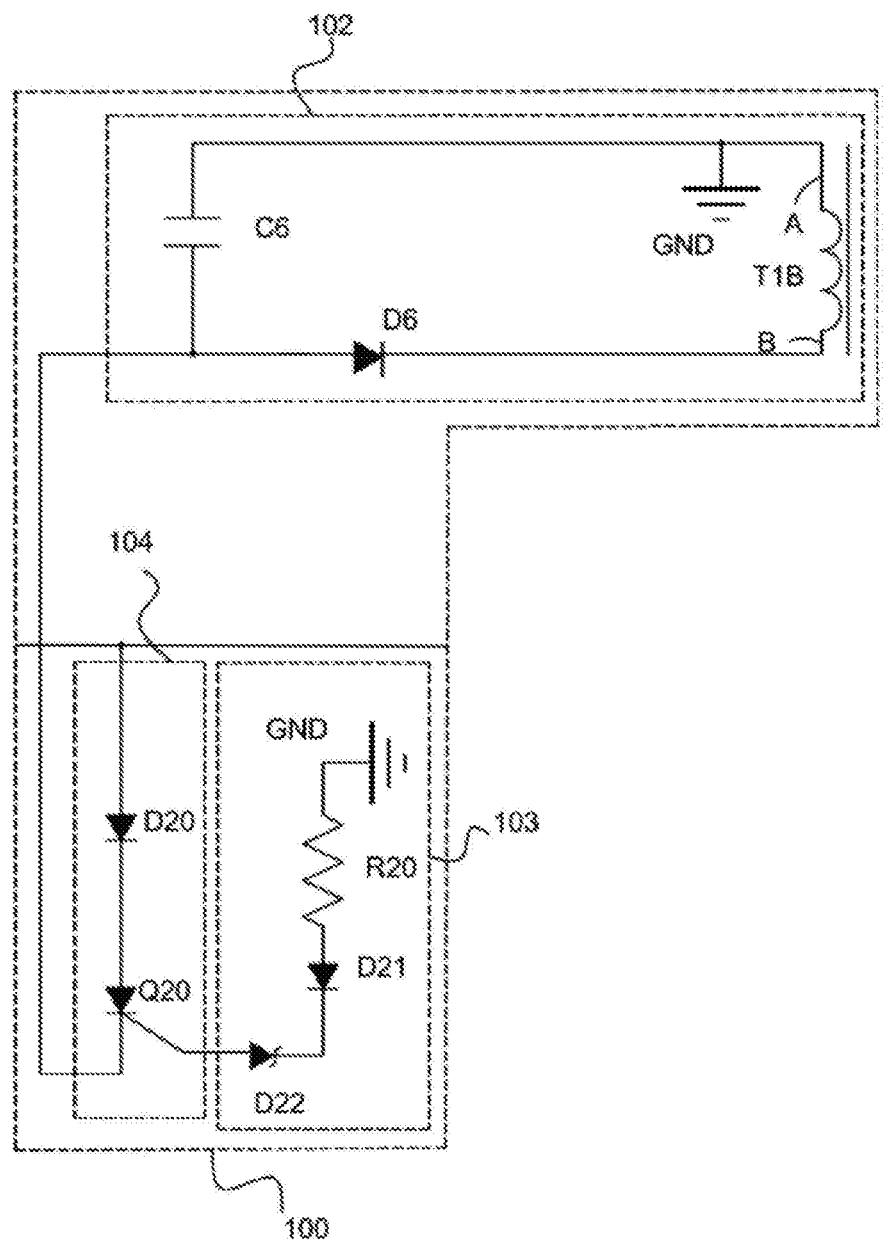
FIG. 3 shows an enlarged view of the protection circuit portion of FIG. 2.

In the embodiment shown in FIG. 3, the protection circuit 100 comprises a detection module 102, a trigger module 103, and a locking module 104. The detection module 102 comprises a second inductor T1B, a first capacitor C6 and a diode D6. The second inductor T1B has two contacts at both ends, the contacts A and B, with the contact B coupled to the cathode of the diode D6, the anode of the diode D6 coupled to one end of the first capacitor C6, while the other end of the first capacitor C6 is grounded. The second inductor T1B and the first inductor T1A are coupled to form a winding for mutual inductance. The contact A of the second inductor T1B and the contact D of the first inductor T1A form the dotted terminal. In other embodiments, the contact point A of the inductor T1B and the contact point C of the inductor T1A may be set as a dotted terminal, but an inverse unit must be added, such as an inverting amplifier. The first capacitor C6 is coupled to the second inductor T1B and detects the voltage at both ends. Since the inductors T1B and T1A form the winding of the mutual inductance, the first capacitor C6 can detect the voltage at both ends of the inductor T1A, i.e., the first capacitor C6 can detect the output voltage from the DC/DC converter.

In the embodiment shown in FIG. 3, the trigger module 103 comprises a current limiting resistor R20, a second diode D21, and a Zener diode D22. One end of the current limiting resistor R20 is grounded while the other end is coupled to the anode of the second diode D21, the cathode of the second diode D21 is coupled to the cathode of the Zener diode D22, and the anode of the Zener diode D22 is coupled to the locking module 104. The trigger module 103 receives the voltage detection signal output from the detection module 102 and outputs a voltage trigger signal when the voltage detection signal is a negative voltage, and the absolute value of the negative voltage is greater than or equal to the preset value. In the embodiment shown in the figure, the preset value is the regulated value of the Zener diode D22, and when the voltage detection signal is greater than the regulated value of the Zener diode D22, the Zener diode D22 is turned on and outputs the voltage trigger signal. In other embodiments, the Zener diode D22 may be a bidirectional trigger diode.

In the embodiment shown in FIG. 3, the locking module 104 comprises a first diode D20 and a thyristor Q20. The anode of the first diode D20 is coupled to the point of intersection between the driving resistor R8 and the second capacitor C5, the cathode of the first diode D20 is coupled to the anode of the thyristor Q20, and the cathode of the thyristor Q20 is coupled to the anode of the diode D6. The first diode D20 is used to prevent the reverse voltage from being supplied to the thyristor Q20 when the DC/DC converter 101 is in normal operation. The gate of the thyristor Q20 is coupled to the anode of the Zener diode D22, which is turned on after being trigged by the voltage trigger signal received from the Zener diode D22, causing the high frequency switch Q1 to stop operating. In other embodiments, the thyristor Q20 may comprise at least two discrete transistors or other equivalent circuits.

The operating principle of the protection circuit 100 shown in FIG. 3 is described below with reference to FIG. 2.

The protection circuit 100 has two modes of operations of monitoring and triggering. Under the monitoring mode, that is, when the load circuit 203 and the DC/DC converter 101 are in normal operation, the locking module 104 within the protection circuit 100 does not operate, i.e., the protection circuit 100 only has the detection module 102 that is electrically connected to the DC/DC converter 101, with no current flowing through the trigger module 103 and the locking module 104, resulting in no additional power loss. The LED lights up as normal.

Under the trigger mode, that is, when the load is damaged, which is equivalent to an open circuit, the voltage at both ends of the load rises rapidly, reaching the starting voltage of the protection circuit 100, i.e., the voltage detection signal output from the detection module 102 is greater than or equal to the regulating value of the Zener diode D22 in the trigger module, and the thyristor Q20 in the locking module 104 is turned on. The locking module 104 electrically connects the first capacitor C6 and the gate of the high frequency switch Q1 so that the driving voltage of the high frequency switch Q1 is reduced to a negative value and stops resonating. The first capacitor C6 is discharged to 0 V, and the thyristor Q20 is continuously turned on and discharges electricity through the starting resistors R5 and R6, thereby completing a cycle, while the driver is in standby mode.

Figure 4:
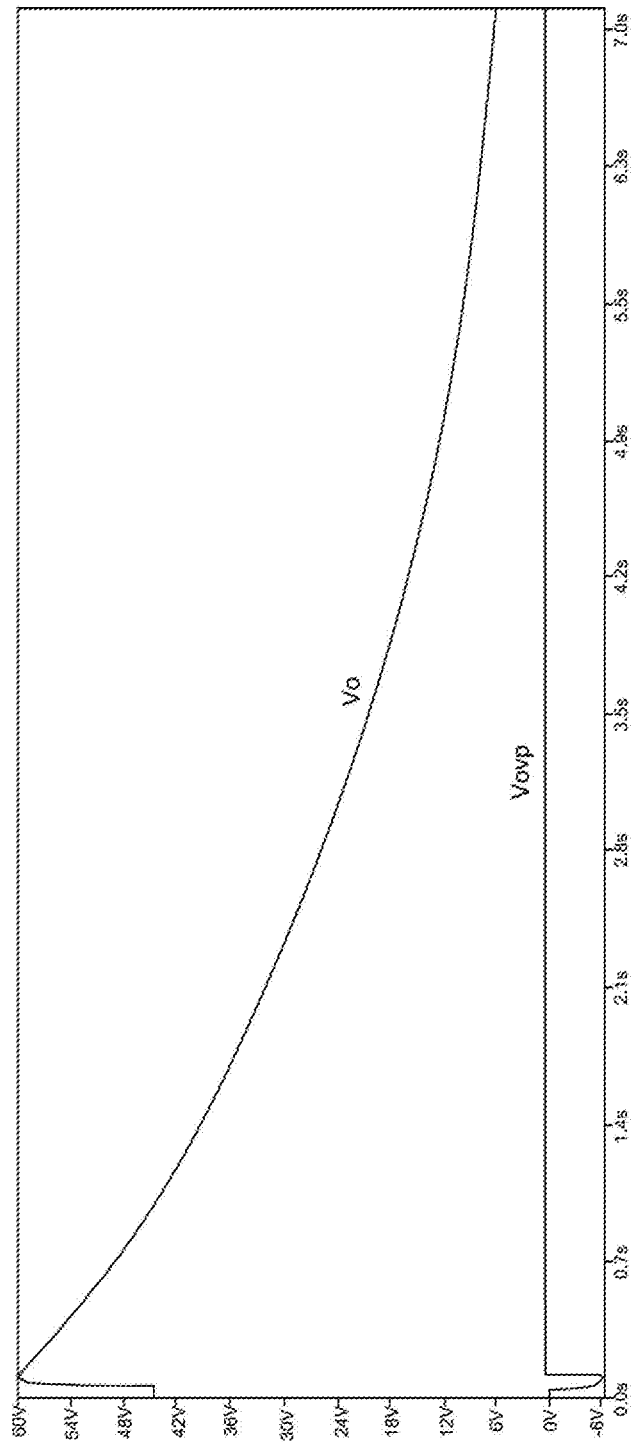
FIG. 4 is a waveform diagram showing the voltage detection signal output from the detection module of the driving circuit of the LED as shown in FIG. 2 and the output voltage of the driver of the LED, in relation to time.
Figure 5:
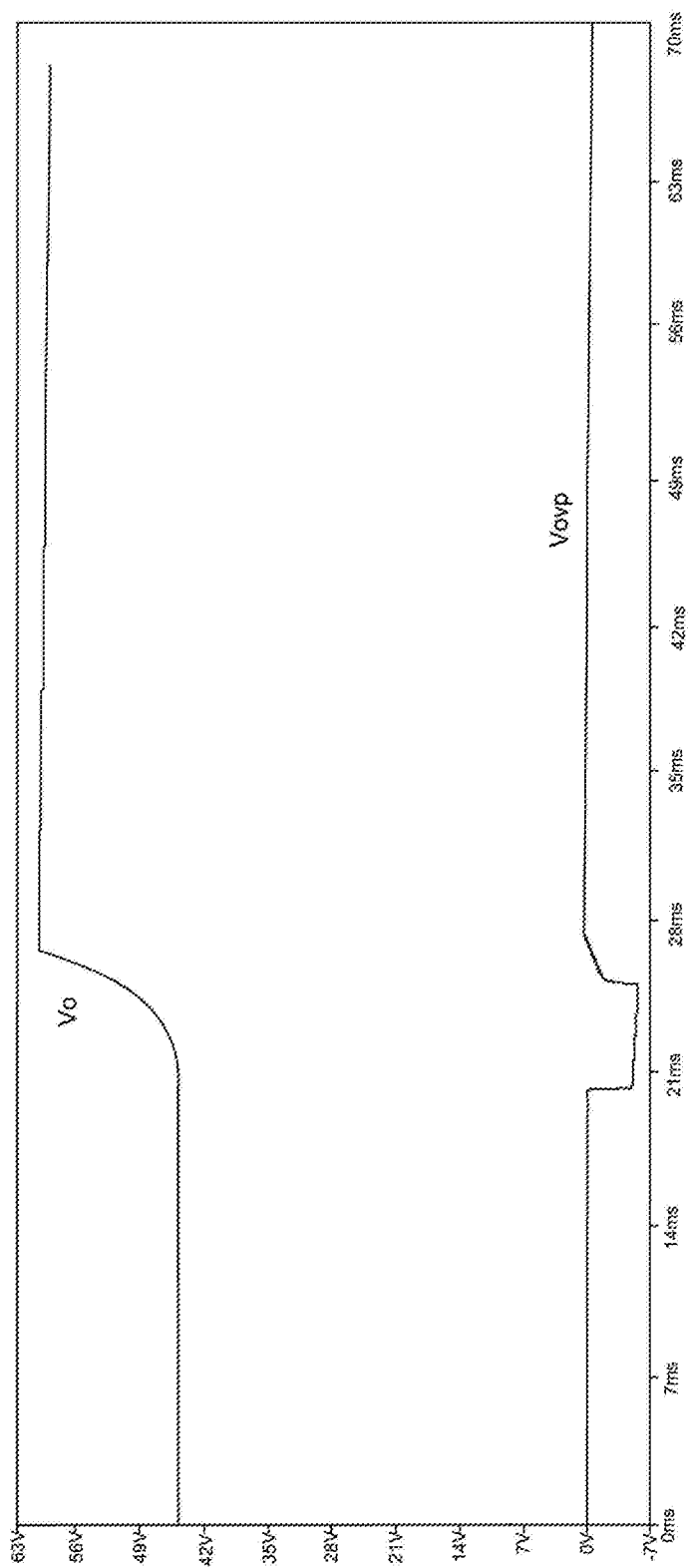
FIG. 5 shows a partial waveform diagram of the voltage detection signal and the output voltage in relation to time as shown in FIG. 4.

FIG. 4 shows the waveform of the voltage detection signal Vovp output from the detection module 102 of the LED driver 200 and the output voltage Vo output from the LED driver 200 in relation to time. FIG. 5 shows a partial magnification of the waveform shown in FIG. 4 between the time period of 0-70 ms. The operating principle of the embodiment shown in FIG. 3 is described below with reference to the waveform of the voltage detection signal Vovp output from the detection module 102 of the LED driver 200 and the output voltage Vo of the LED driver 200 in relation to time, as shown in FIGS. 4 and 5.

As shown in FIGS. 4 and 5, when the load is operating as normal, the voltage Vo at both ends of the load is 45 V, while the protection circuit 100 is not operating. When the load is damaged, the voltage Vo at both ends of the load rises rapidly, and the absolute value of the negative voltage Vovp at both ends of the first capacitor C6 in the detection module also rises rapidly. When the absolute value of the voltage Vovp is increased to the regulating value (about 6.8 V) of the Zener diode D22, the thyristor Q20 is turned on, the high frequency switch Q1 stops resonating, and the voltage Vovp at both ends of the first capacitor C6 drops rapidly to 0 V. Through the power loss of the starting resistors R5 and R6, the voltage Vo at both ends of the load is gradually reduced to 0 V, thereby achieving the objective of protecting the load circuit 203 as well as the entire LED driver 200.

As described above, the protection circuit 100 of the LED driver 200 of the present invention responds quickly when the load is damaged to achieve overvoltage protection. When the driver 200 is operating as normal, no current is flowing in the locking circuit 103, reducing the additional power loss of the entire circuit. Also, when the DC/DC converter and the dimming circuit are combined, the protection circuit does not participate in the operating resonance of the driver, thereby improving the universality of the dimming circuit.

While the present invention has been described in detail with reference to specific embodiments thereof, it will be understood by those skilled in the art that many modifications and variations can be made in the present invention. It is, therefore, to be understood that the appended claims are intended to cover all such modifications and variations insofar as they are within the true spirit and scope of the invention.

What I claim is:

1. An LED driver, comprising:
 a DC/DC converter for converting an input voltage at a DC voltage input terminal into an output voltage, the DC/DC converter comprises a high frequency switch and a first inductor; and
 a protection circuit, comprising:
 a detection module coupled to the first inductor for detecting the output voltage and outputting a voltage detection signal;
 a trigger module for receiving the voltage detection signal and outputting a voltage trigger signal when the voltage detection signal is a negative voltage and the absolute value of the negative voltage is greater than or equal to the preset value; and
 a locking module coupled to the trigger module and stopping the high frequency switch from operating after receiving the voltage trigger signal;
 wherein the DC/DC converter further comprises a peak limiting circuit of the high frequency switch, the peak limiting circuit comprising a comparator, and when the operating voltage of the high frequency switch is greater than the preset value of the comparator, the high frequency switch is short-circuited by the peak limiting circuit.

2. The driver of claim 1, wherein the detection module comprises a first capacitor and a second inductor, the second inductor is coupled to the first inductor for detecting the output voltage, and the first capacitor is coupled to the second inductor to output the voltage detection signal based on the detection of the output voltage.

3. The driver of claim 2, wherein the DC/DC converter further comprises a second capacitor in series with a driving resistor, the second capacitor is coupled to the second inductor, the driving resistor is coupled to the driving terminal of the high frequency switch, and the second capacitor, the second inductor and the driving resistor work together to control the resonance of the high frequency switch.

4. The driver of claim 1, wherein the DC/DC converter further comprises a damping circuit coupled to the DC voltage input terminal, the damping circuit comprising a third capacitor and a damping resistor in series.

5. The driver of claim 1, wherein when the DC/DC converter is operating as normal, the locking module is not operating.

6. The driver of claim 1, wherein the locking module comprises a thyristor or at least two discrete transistors, and when the thyristor or the gate of at least two discrete transistors receives the voltage signal output from the trigger module, the thyristor or at least two discrete transistors turn on after being triggered.

7. The driver of claim 6, wherein the locking module further comprises a first diode, the first diode is coupled between the thyristor and the gate of the high frequency switch, and is used to prevent a reverse voltage from being delivered to the thyristor during normal operations of the DC/DC converter.

8. The driver of claim 1, wherein the trigger module comprises a Zener diode, the cathode of the Zener diode is coupled to the locking module, and when the voltage detection signal output from the detection module is greater than or equal to the preset value, the Zener diode is turned on.

9. The driver of claim 8, wherein the trigger module further comprises a current limiting resistor and a second diode connected in series between the Zener diode and the ground terminal.

10. The driver of claim 1, wherein at least one LED is coupled to the output terminal of the DC/DC converter to form an optical device.

11. A DC/DC converter protection circuit, wherein the DC/DC converter is used to convert an input voltage at a DC voltage input terminal into an output voltage, the DC/DC converter comprising a high frequency switch and a first inductor, and wherein the protection circuit comprises:
   a detection module coupled to the first inductor for detecting the output voltage and outputting a voltage detection signal;
   a trigger module for receiving the voltage detection signal and outputting a voltage trigger signal when the voltage detection signal is a negative voltage and the absolute value of the negative voltage is greater than or equal to the preset value; and
   a locking module coupled to the triggering module and stopping the high frequency switch from operating after receiving the voltage trigger signal, wherein the locking module comprises a thyristor or at least two discrete transistors, and when the thyristor or the gate of at least two discrete transistors receives the voltage signal output from the trigger module, the thyristor or at least two discrete transistors turn on after being triggered.

12. The protection circuit of claim 11, wherein the detection module comprises a first capacitor and a second inductor, the second inductor is coupled to the first inductor for detecting the output voltage, and the first capacitor is coupled to the second inductor for outputting the voltage detection signal based on the detection of the output voltage.

13. The protection circuit of claim 11, wherein when the DC/DC converter is operating as normal, the locking module is not operating.

14. The protection circuit of claim 11, wherein the locking module further comprises a first diode coupled between the thyristor and the gate of the high frequency switch for preventing a reverse voltage from being delivered to the thyristor when the DC/DC converter is operating as normal.

15. The protection circuit of claim 11, wherein the trigger module comprises a Zener diode, the cathode of the Zener diode is coupled to the locking module, and when the voltage detection signal output from the detection module is greater than or equal to the preset value, the Zener diode is turned on.

16. The protection circuit of claim 15, wherein the trigger module further comprises the current limiting resistor and the second diode connected in series between the Zener diode and the ground terminal.

* * * * *